(12) United States Patent
Nakayama

(10) Patent No.: US 12,047,554 B2
(45) Date of Patent: Jul. 23, 2024

(54) MONITORING SYSTEM AND CAMERA

(71) Applicant: HITACHI KOKUSAI ELECTRIC INC., Tokyo (JP)

(72) Inventor: Keita Nakayama, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 79 days.

(21) Appl. No.: 17/932,169

(22) PCT Filed: Mar. 24, 2020

(86) PCT No.: PCT/JP2020/012868
§ 371 (c)(1),
(2) Date: Sep. 14, 2022

(87) PCT Pub. No.: WO2021/191998
PCT Pub. Date: Sep. 30, 2021

(65) Prior Publication Data
US 2023/0362349 A1 Nov. 9, 2023

(51) Int. Cl.
*H04N 7/18* (2006.01)
*B61L 15/00* (2006.01)
(Continued)

(52) U.S. Cl.
CPC ........ *H04N 17/002* (2013.01); *B61L 15/0081* (2013.01); *B61L 15/009* (2013.01);
(Continued)

(58) Field of Classification Search
CPC ........ H04N 17/002; H04N 7/18; H04N 7/183; H04N 5/217; B61L 15/0081;
(Continued)

(56) References Cited

U.S. PATENT DOCUMENTS 9,288,381 B2 * 3/2016 Irie .................... G02B 27/0006
9,445,057 B2 * 9/2016 May ......................... G06T 7/70
(Continued)

FOREIGN PATENT DOCUMENTS

GB 2608319 A 12/2022
JP 2011016421 A 1/2011
(Continued)

OTHER PUBLICATIONS

UK Intellectual Property Office Examination Report dated Jun. 19, 2023 (4 pages).
(Continued)

*Primary Examiner* — Trang U Tran
(74) *Attorney, Agent, or Firm* — Greer, Burns & Crain, Ltd.

(57) ABSTRACT

A monitoring system is provided and includes a camera attached to a train car that takes an image of the vicinity of a door of the car, where a monitor displays a camera image taken by the camera and a dirt detection unit executes a dirt detection process for detecting dirt on the front glass of the camera. This configuration thereby allows the dirt detection unit to determine the execution timing for a dirt detection process on the basis of the train information that indicates
(Continued)

the operational state of the train to execute the dirt detection process by using the camera image that has been obtained according to the execution timing.

7 Claims, 4 Drawing Sheets

(51) Int. Cl.
  *G06T 7/00* (2017.01)
  *H04N 17/00* (2006.01)
(52) U.S. Cl.
  CPC ........... *G06T 7/0002* (2013.01); *H04N 7/183* (2013.01); *G06T 2207/30168* (2013.01); *G06T 2207/30232* (2013.01); *G06T 2207/30252* (2013.01)
(58) Field of Classification Search
  CPC ................ B61L 15/009; G06T 7/0002; G06T 2207/30168; G06T 2207/30232; G06T 2207/30252
  USPC .......................................................... 348/148
  See application file for complete search history.

(56) References Cited

U.S. PATENT DOCUMENTS

| | | | |
|---|---|---|---|
| 10,706,293 | B1 * | 7/2020 | Lei .......................... G07C 5/008 |
| 11,061,121 | B2 * | 7/2021 | Astrom ................ H04N 13/296 |
| 2016/0282874 | A1 | 9/2016 | Kurata et al. |
| 2017/0013237 | A1 | 1/2017 | Ito |
| 2019/0084526 | A1 | 3/2019 | Seubert et al. |
| 2021/0124934 | A1 | 4/2021 | Ohki |

FOREIGN PATENT DOCUMENTS

| | | |
|---|---|---|
| JP | 2020016862 A | 1/2020 |
| WO | 2015068249 A1 | 5/2015 |
| WO | 2015145736 A1 | 10/2015 |
| WO | 2018180310 A1 | 10/2018 |

OTHER PUBLICATIONS

International Search Report issued in PCT/JP2020/012868, dated Jun. 9, 2020 (4 pages).

* cited by examiner

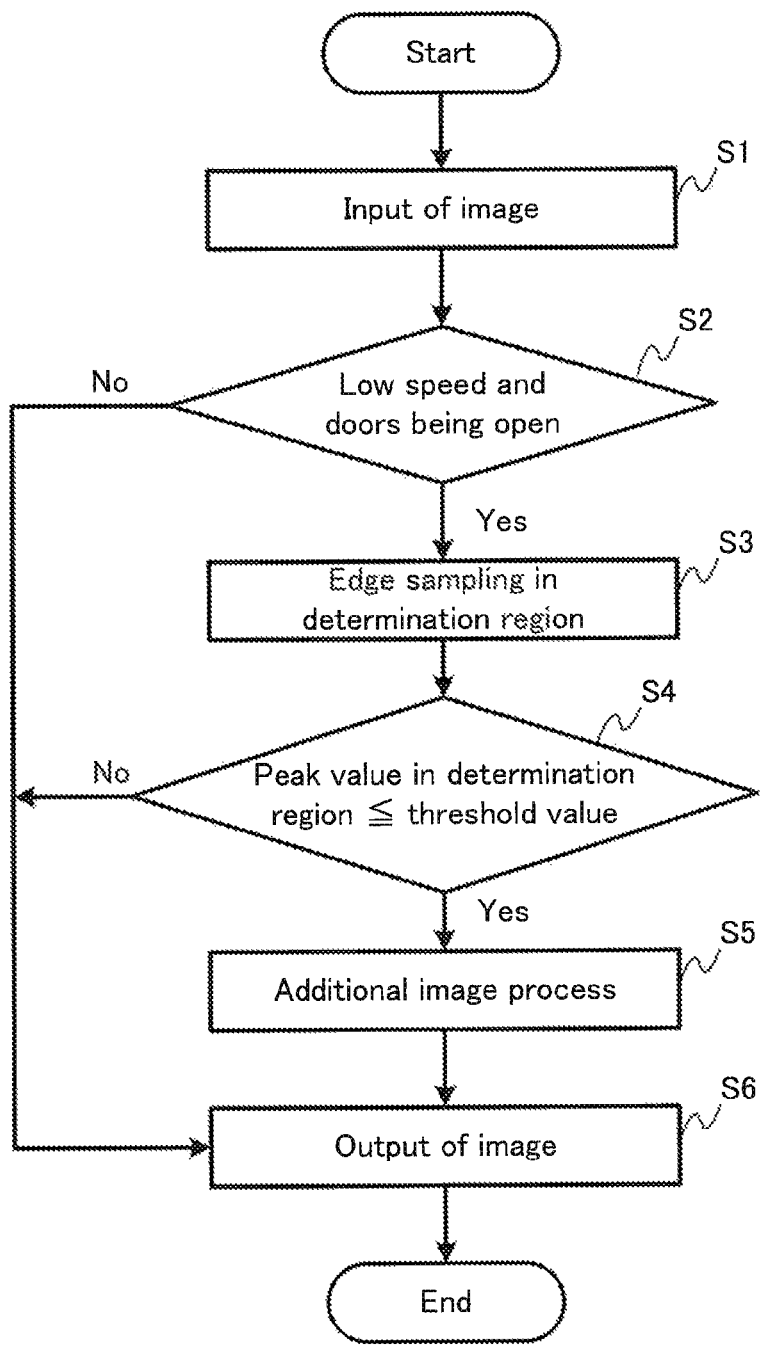

MONITORING SYSTEM AND CAMERA

CROSS-REFERENCE TO RELATED APPLICATIONS

This application is a national stage application, filed under 35 U.S.C. § 371 of International Patent Application No. PCT/JP2020/012868 filed on Mar. 24, 2020, which is incorporated by reference herein in its entirety.

TECHNICAL FIELD

The present invention relates to a monitoring system for monitoring the vicinity of a door of a train by means of a camera image.

BACKGROUND

In train systems, a train driver or a trainman (hereinafter, these are simply referred to as "trainman") checks passengers who move along a platform by means of an image in order to control the opening and closing of doors after confirming the safety of the passengers. The image of the passengers is taken by a camera that is installed on the main body of a car of the train or along the platform so as to be displayed on a monitor in the cabin of the train or on a monitor along the platform. The difference in the location where the camera has been installed is mainly caused by the difference of whether the operation of the train and the infrastructure are managed by the same company or different companies.

In the following, a monitoring system for displaying an image of a camera that is installed on the main body of a car of a train on a monitor in the cabin is described. For example, International Publication No. WO 2015/135736 discloses a system where a camera is arranged adjacent to each door of the cars.

Patent Literature 1: WO2015/135736A1

SUMMARY

In the above-described system, it is important to take a camera image having high visibility in order for a trainman to control the opening and closing of the doors safely and efficiently. While the operation of the train continues, however, the camera image could be hazy as compared to the time when the state is normal if dirt, such as dust, adheres to the front glass of the camera. That is to say, it has been confirmed that the contrast of the camera image decreases during the operation of the train, which lowers the visibility. In many cases, the visibility of the camera image that has been lowered can be recovered by cleaning the front glass of the camera. However, many cameras are attached to the train, and therefore, the burden of maintenance, including the cleaning operation, increases. Thus, a scheme for making the cleaning of the front glass of the cameras efficient has been required.

The present invention has been made in view of the above-described conventional situation, and an object thereof is to make it possible to efficiently detect dirt on the front glass of the cameras.

Solution to Problems

In order to achieve the above-described object, the present invention provides the following configuration of a monitoring system.

That is to say, the monitoring system according to the present invention is provided with: a camera that is attached to the outside of a car of a train and that can take an image of the vicinity of a door of the car; a monitor that displays a camera image taken by the camera; and a dirt detection unit that executes a detection process on dirt on the front glass of the camera by using a camera image, wherein the dirt detection unit determines the execution timing for the detection process on the basis of train information that indicates the operational state of the train, and thus executes the detection process by using the camera image that has been gained in accordance with the execution timing.

Here, the train information may include information on the speed of the train and information on the opening and closing of the doors, and the dirt detection unit may determine the timing when the speed of the train is a predetermined value or less in the state where the doors are closed as the execution timing.

In addition, the dirt detection unit may execute a detection process on a region of a car body part in a camera image.

Furthermore, the dirt detection unit may add dirt detection information to the metadata of a camera image in the case where dirt is detected on the front glass.

Moreover, the dirt detection unit may determine the execution timing for the detection process under the condition where the time is in a preset time band or the train is in a preset location.

In addition, the dirt detection unit may detect dirt on the front glass by comparing the peak value of the edge components that have been detected from the camera image with a threshold value. In this case, the threshold value may be changed in accordance with the time band or the location of the train when the detection process is executed.

Furthermore, the dirt detection unit may be built into the camera or may be provided in another device that can acquire a camera image.

Advantageous Effects of the Invention

The present invention makes it possible to efficiently detect dirt on the front glass of a camera.

BRIEF DESCRIPTION OF THE DRAWINGS

FIG. 4 is a flow chart showing an example of the dirt detection process.

DETAILED DESCRIPTION

One embodiment of the present invention is described below in reference to the drawings.

Figure 1:
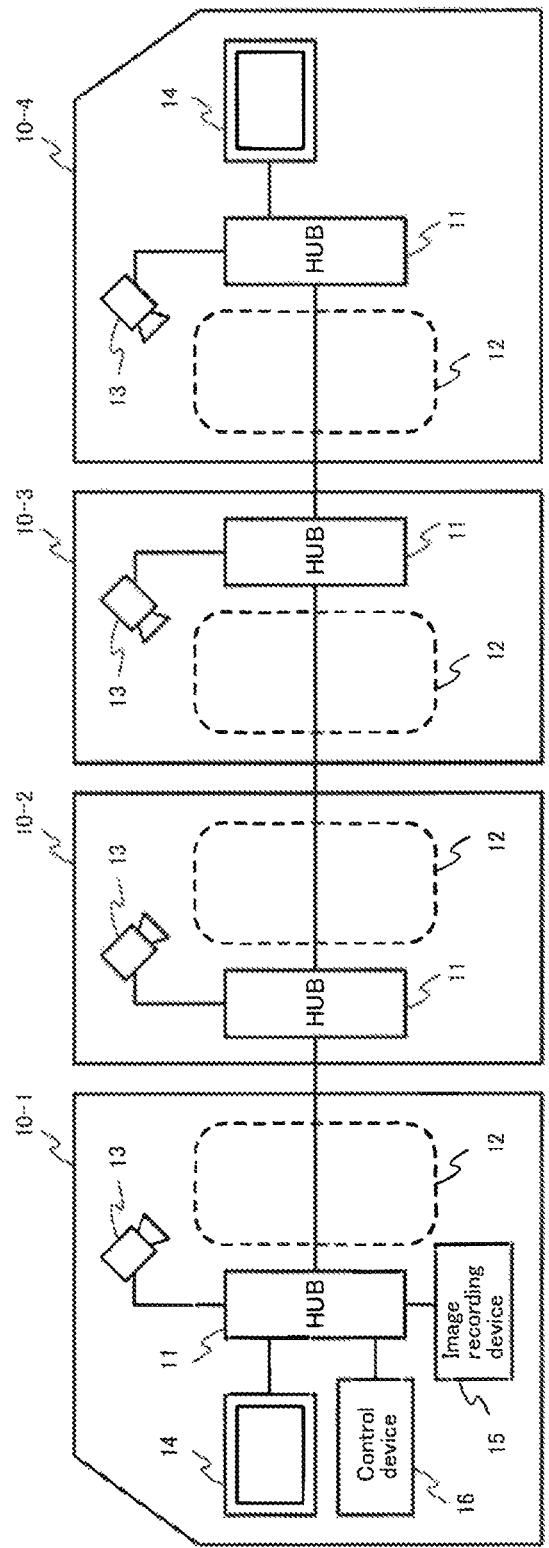
FIG. 1 is a schematic diagram showing an example of the configuration of the monitoring system according to one embodiment of the present invention.

FIG. 1 is a schematic diagram showing an example of the configuration of the train equipment type monitoring system according to one embodiment of the present invention. FIG. 1 shows a train formed of four cars where the first car 10-1, the second car 10-2, the third car 10-3, and the fourth car 10-4 are connected.

One switching hub 11 is arranged on each car 10-1 through 10-4, and these switching hubs are cascade connected so as to construct a network within the train. In addition, a camera 13 is attached to the outer side of each car 10-1 through 10-4 so as to be directed toward the door 12 of the car so that an image that shows how passengers get on or off of the train can be taken. That is to say, the configuration allows the camera 13 to take an image of the vicinity of the door.

A monitor 14 for displaying the camera image that has been taken by the camera 13 on each car is installed in the trainman's compartment in the first car 10-1 and the fourth car 10-4. The trainman can confirm the state of the passengers in the vicinity of the doors of each car by means of the image on the monitor 14. In addition, a control device 16 for collectively controlling the present system and a recording device 15 for recording camera images are installed in the first car 10-1.

The main feature of the present system is that the camera 13 has a built-in function for detecting dirt on the front glass of the camera 13. That is to say, the camera 13 executes a dirt detection process for detecting dirt on the front glass by using the camera image that has been taken by the camera 13 itself. Here, the camera 13 determines the execution timing for the dirt detection process on the basis of the train information that indicates the operational state of the train, and executes a dirt detection process by using the camera image that has been gained in accordance with the execution timing.

The camera 13 in the present example is provided with hardware resources such as a memory and a processor so as to be configured in such a manner that the below-described process is carried out by reading out the program that has been stored in a data storage device, such as a hard disc or a flash memory, onto the main memory and running the program by means of the processor. Here, the configuration is not limited to the one where the function of the camera 13 is implemented by means of such software, but may be one where the function is implemented by dedicated hardware.

In the following, the dirt detection process that is executed by the camera 13 is described in reference to FIGS. 2 through 4.

Figure 2:
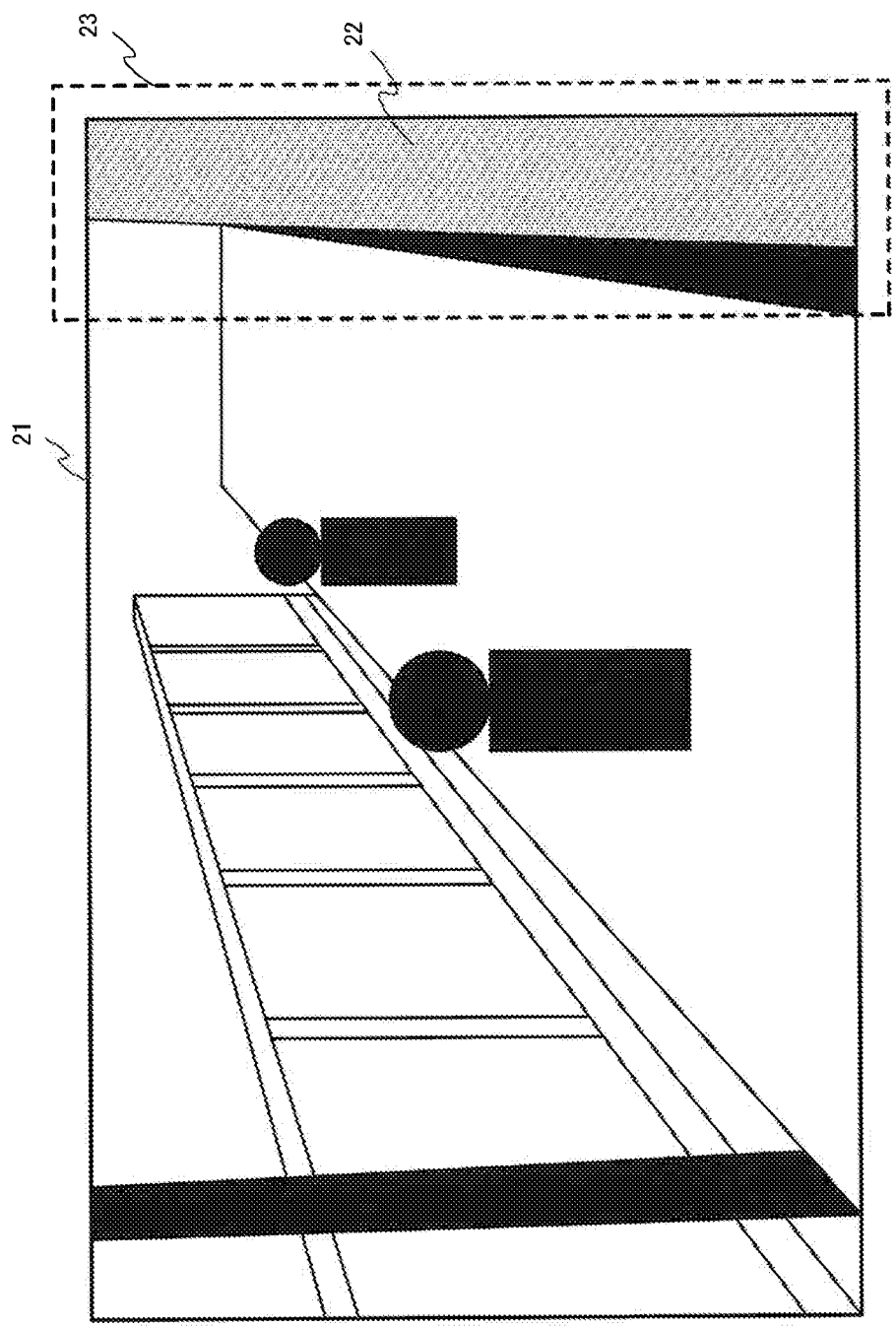
FIG. 2 is a diagram showing an example of a camera image in the monitoring system in FIG. 1.

FIG. 2 shows an example of a camera image that has been taken by the camera 13. As shown in this figure, the camera image 21 that is used in the present system is composed in such a manner where part of the car body 22 of the train (concretely, the vicinity of a door of the car body 22) is always shown in a region on one end in the lateral direction. In addition, the remaining part of the camera image 21 shows different views depending on the location where the train is running such as the outside scenery or a platform of a station. FIG. 2 is composed in such a manner where part of the car body 22 is shown on the right side of the camera image 21; however, in some cases, part of the car body 22 appears on the left side depending on the location in which the camera 13 is installed. In the present system, the determination region 23 that becomes the target of a dirt detection process is set so as to include the region where the car body 22 always appears.

Figure 3:
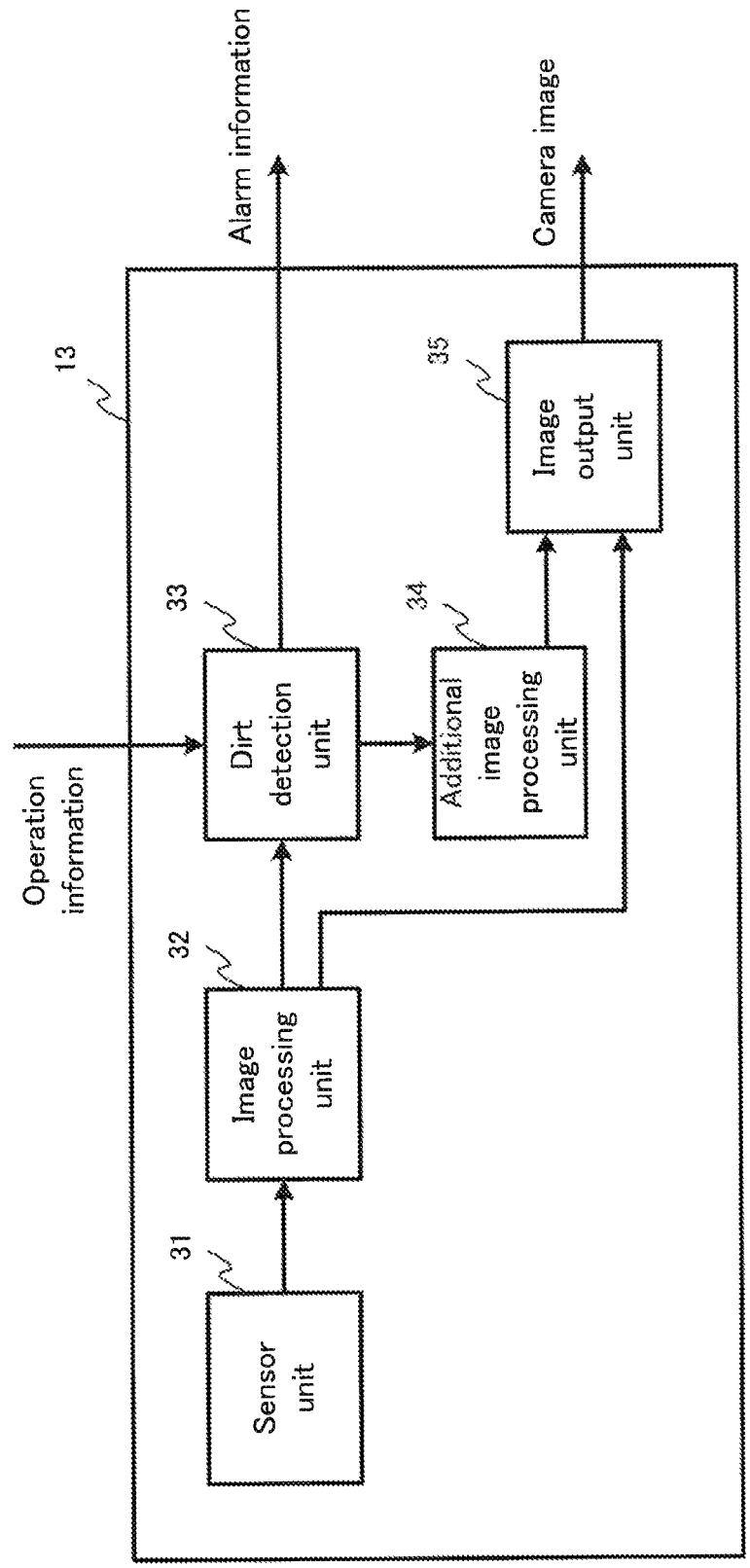
FIG. 3 is a diagram showing an example of the configuration of a camera having a built-in dirt detection function.

FIG. 3 shows an example of the configuration of the camera 13 that is used in the present system. The camera 13 has a sensor unit 31, an image processing unit 32, a dirt detection unit 33, an additional image processing unit 34, and an image output unit 35.

The sensor unit 31 is a so-called image pickup device, and converts an optical image that has entered through the front glass and a lens into an image signal (electrical signal). The image processing unit 32 carries out image processes until the image signal that is outputted from the sensor unit 31 is converted to the final image quality, which is then outputted to the dirt detection unit 33 and the image output unit 35.

In addition to the image signal that is outputted from the image processing unit 32, train information from the train car side is inputted into the dirt detection unit 33. This train information at least includes information on the speed of the train and information on the opening and closing of the doors. The dirt detection unit 33 determines whether or not the speed of the train is a predetermined value or less in the state where the doors are closed on the basis of this train information. In addition, the timing when the speed of the train is a predetermined value or less in the state where the doors are closed is determined as the execution timing for the dirt detection process.

The dirt detection unit 33 uses the image signal that has been gained in accordance with the execution timing for the dirt detection process in order to execute the dirt detection process. Concretely, an edge detection filter is applied to the image signal so as to detect edge components from within the above-described determination region 23, and then, the peak value of the edge components is compared with a predetermined threshold value (fixed value in the present example). In the case where the peak value of the edge components is the threshold value or less resulting from the comparison, the image is in a state where the contrast has been lowered, and thus, it is determined that the front glass has dirt thereon. Then, alarm information to the effect that dirt has been detected on the front glass is outputted, and at the same time, an additional image process is instructed to the additional image processing unit 34.

The additional image processing unit 34 follows the instructions from the dirt detection unit 33 so as to carry out an additional image process on the image signal that is outputted from the image processing unit 32. The additional image process may be any process that can improve the visibility of the image, and a haze removal process for stretching the contrast of the image can be cited as an example. The image signal after the additional image process by means of the additional image processing unit 34 is outputted to the image outputting unit 35.

The image output unit 35 usually outputs the image signal from the image processing unit 32 to the outside of the camera. In the case where the dirt detection unit 33 has detected dirt on the front glass, the image signal from the additional image processing unit 34 is outputted to the outside of the camera in place of the image signal from the image processing unit 32. Here, the image output unit 35 may output both the image signal from the image processing unit 32 and the image signal from the additional image processing unit 34.

The image signal (camera image) that has been outputted from the image output unit 35 is transmitted to the monitor 14 through the network within the train and displayed on the monitor 14. In addition, the alarm information that has been outputted from the dirt detection unit 33 is transmitted to the monitor 14 through the network within the train and displayed on the monitor 14 together with the camera image. Accordingly, it becomes possible for the trainman who has seen the display on the monitor 14 not only to be able to confirm the state of the passengers, but also to grasp the condition of the front glass of the camera 13 in the case where dirt is present. A great number of cameras 13 is attached to the train, and therefore, it is preferable for the display to be in such a manner that it can be understood which camera 13 has dirt on the front glass.

FIG. 4 shows the flow chart of the dirt detection process.

The image signal from the image processing unit 32 is inputted into the dirt detection unit 33 (step S1). The dirt detection unit 33 determines whether or not the speed of the train is a predetermined value or less in the state where the doors are closed on the basis of the train information that is separately inputted from the train car side (step S2). In the case where this condition is not present ("No" in step S2), the image signal from the image processing unit 32 is outputted from the image outputting unit 35 (step S6). Meanwhile, in the case where it has been determined that this condition is present ("Yes" in step S2), the dirt detection unit 33 applies an edge detection filter to the image signal from the image processing unit 32 in order to detect the edge components from within the determination region 23 (step S3).

After that, the dirt detection unit 33 determines whether or not the peak value of the edge components within the determination region 23 is a threshold value or less (step S4). In the case where it has been determined that this condition is not present ("No" in step S4), the image signal from the image processing unit 32 is outputted from the image output unit 35 (step S6). Meanwhile, in the case where it has been determined that this condition is present ("Yes" in step S4), alarm information is outputted from the dirt detection unit 33, and at the same time, an additional image process (haze removal process, for example) is carried out by the additional image processing unit 34 (step S5). After that, the image signal after the image processing by means of the additional image processing unit 34 is outputted from the image output unit 35 (step S6).

As described above, the monitoring system in the present example is provided with: a camera 13 that is attached to the outside of a car of a train and that can take an image of the vicinity of a door of the car; a monitor 14 that can display a camera image taken by the camera 13; and a dirt detection unit 33 that can execute a dirt detection process for detecting dirt on the front glass of the camera 13. Thus, the configuration allows the dirt detection unit 33 to determine the execution timing for a dirt detection process on the basis of the train information that indicates the operational state of the train in order to execute the dirt detection process by using the camera image that has been obtained according to the execution timing.

In such a configuration, the timing according to which an appropriate camera image for executing a dirt detection process can be gained can be determined by taking the operational state of the train into consideration, and therefore, dirt on the front glass of a camera can be efficiently detected.

In addition, the configuration in the present example allows the dirt detection unit 33 to determine the timing according to which the speed of the train is a predetermined value or less in the condition where the doors are closed as the execution timing for the dirt detection process. As a result, the dirt detection process can be executed by using a camera image that shows a state where the train has entered the platform area, and no passengers are shown around the periphery of the door, and therefore, the dirt detection can be implemented with high precision.

In addition, the dirt detection unit 33 in the present example is configured in such a manner that the region of the car body part in the camera image is designated as the determination region 23, and the dirt detection process is executed on the determination region 23. As a result, only the analysis of the condition in a region where image alteration is small is necessary, and wasteful processes on other regions can be omitted, and therefore, the process burden of the dirt detection process can be reduced.

According to the above description, alarm information is merely outputted, and only an additional image process (haze removal process, for example) is carried out in the case where dirt is detected on the front glass of a camera; however, another process may be carried out in place of or in addition to these processes.

For example, in the case where dirt is detected on the front glass, the dirt detection unit 33 may add dirt detection information to the metadata of the camera image. The metadata is data that relates to train information accompanying the camera image, and is stored in a data region that does not affect the image display of the camera image or is stored as a different piece of data that can be associated with the camera image. As examples of the dirt detection information, a dirt detection flag that indicates to the effect that dirt has been detected, the dirt detection time, the dirt detection location and the like can be cited. The dirt detection location can be acquired by utilizing a GPS (global positioning system), for example. When and where the front glass of a camera has gotten dirt can be understood after the event by adding dirt detection information as described above to the metadata of the camera image. In addition, the dirt detection information can be used as the material to be examined when a measure for dirt prevention is to be carried out, for example.

According to the above description, the execution timing for the dirt detection process is determined on the basis of the information on the speed of the train and information on the opening and closing of the doors; however, other pieces of information may be additionally taken into consideration. For example, the execution timing for the dirt detection process may be determined under the condition where the time is in the preset time band. As a result, it becomes unnecessary to execute the dirt detection process in a time band when it is difficult for a clear image to be gained (in the evening, for example), and therefore, it becomes possible to suppress the output of wasteful alarm information due to an error in detecting the dirt. As another example, the execution timing for the dirt detection process may be determined under the condition where the train is in a preset location. As a result, it becomes unnecessary to execute the dirt detection process in a station where it is difficult to clean the front glass of the cameras (a station where there are no sanitation workers or a station where the time during which a train stops is short, for example), and therefore, it becomes possible to reduce the work burden of cleaning the front glass of the cameras.

According to the above description, the peak value of the edge components that have been detected from the camera image is compared to a fixed threshold value; however, the threshold value may be variable. As an example, the threshold value may be changed in accordance with the time band when the detection process is executed. As a result, the dirt detection process can be executed by taking into consideration the difference in the contrast of the camera image depending on the time band when the image is taken, and therefore, dirt on the front glass of a camera can be detected more precisely. As another example, the threshold value may be changed in accordance with the location of the train when the detection process is executed. As a result, the dirt detection process can be executed by taking into consideration the difference in the contrast of the camera image between a station where the platforms have a roof and a station where there are no roofs, and therefore, dirt on the front glass of a camera can be detected more precisely.

According to the above description, the dirt detection unit 33 that is built into a camera 13 executes a dirt detection process; however, another device (control device 16, for example) that is connected to the network within the train may execute the dirt detection process. That is to say, the dirt detection process can be executed by an arbitrary device that can acquire a camera image.

Though the present invention is described in detail in the above, the present invention is not limited to the above-described configurations, but needless to say may be implemented with configurations other than the above. For example, it is possible for the present invention to be applied to various types of trains that include a monorail and a streetcar in addition to a train that runs on a railway.

It is also possible to provide the present invention as a method that includes a technical procedure relating to the above-described processes, a program for allowing a processor to execute the above-described processes, a storage medium for storing such a program in a computer readable manner, and the like.

Here, the scope of the present invention is not limited to the illustrative embodiments that are shown and described herein and includes all the embodiments that provide equal effects targeted by the present invention. Furthermore, the scope of the present invention can be defined by all the desired combinations of the specific features from among all the features that have been disclosed herein.

INDUSTRIAL APPLICABILITY

It is possible to apply the present invention to a monitoring system for monitoring the vicinity of a door of a train by means of a camera image.

The invention claimed is:

1. A train equipment type monitoring system, comprising:
a camera that is attached to the outside of a car of a train and that takes an image of the vicinity of a door of the car;
a monitor that displays a camera image taken by the camera; and
a dirt detection unit that executes a detection process on dirt on a front glass of the camera by using the camera image,
wherein the dirt detection unit determines an execution timing for the detection process on the basis of train information that indicates an operational state of the train, and thus executes the detection process by using the camera image that has been gained in accordance with the execution timing, and
wherein the train information includes information on the speed of the train and information on the opening and closing of the doors, and the dirt detection unit determines the timing when the speed of the train is equal to or less than a predetermined value when the doors are closed as the execution timing.

2. The monitoring system according to claim 1, wherein the dirt detection unit executes the detection process on a region of a car body part in the camera image.

3. The monitoring system according to claim 1, wherein the dirt detection unit adds dirt detection information to metadata of the camera image in the case where dirt is detected on the front glass.

4. The monitoring system according to claim 1, wherein the dirt detection unit determines the execution timing under the condition where the time is in a preset time band or the train is in a preset location.

5. The monitoring system according to claim 1, wherein the dirt detection unit detects dirt on the front glass by comparing the peak value of the edge components that have been detected from the camera image with a threshold value, and
the threshold value is changed in accordance with the time band or the location of the train when the detection process is executed.

6. The monitoring system according to claim 1, wherein the dirt detection unit is built into the camera.

7. A camera that is attached to the outside of a car of a train and that takes an image of the vicinity of a door of the car, the camera comprising:
a built-in dirt detection unit that executes a detection process on dirt on a front glass of the camera by using a camera image, wherein the dirt detection unit determines an execution timing for the detection process on the basis of train information that indicates an operational state of the train, executes the detection process by using the camera image that has been gained in accordance with the execution timing, and adds dirt detection information to metadata of the camera image in the case where dirt is detected on the front glass, wherein the train information includes information on the speed of the train and information on the opening and closing of the doors, and the dirt detection unit determines the timing when the speed of the train is equal to or less than a predetermined value when the doors are closed as the execution timing.

* * * * *